United States Patent [19]

Spietschka et al.

[11] 4,229,583

[45] Oct. 21, 1980

[54] PROCESS FOR PREPARING THIO-INDIGO DYESTUFFS

[75] Inventors: Ernst Spietschka, Idstein; Manfred Urban, Wiesbaden, both of Fed. Rep. of Germany

[73] Assignee: Hoechst Aktiengesellschaft, Frankfurt am Main, Fed. Rep. of Germany

[21] Appl. No.: 959,446

[22] Filed: Nov. 13, 1978

Related U.S. Application Data

[63] Continuation-in-part of Ser. No. 655,102, Feb. 4, 1976.

[30] Foreign Application Priority Data

Feb. 6, 1975 [DE] Fed. Rep. of Germany ....... 2504935

[51] Int. Cl.² .............................................. C09B 7/00
[52] U.S. Cl. ..................................................... 549/52
[58] Field of Search ................... 260/331, 332; 549/52

[56] References Cited

U.S. PATENT DOCUMENTS

| 2,158,032 | 5/1939 | Lubs | 260/331 |
| 2,173,506 | 9/1939 | Cole | 260/331 |

OTHER PUBLICATIONS

Rose "The Condensed Chem. Dict." (1956), 5th ed. p. 74.

*Primary Examiner*—A. Siegel
*Attorney, Agent, or Firm*—Curtis, Morris & Safford

[57] ABSTRACT

Thioindigo and its derivatives are obtained in high yield and excellent purity by oxidizing corresponding 3-hydroxythionaphthenes with peroxo-disulfate in an aqueous alkaline solution.

6 Claims, No Drawings

PROCESS FOR PREPARING THIO-INDIGO DYESTUFFS

This is a continuation-in-part of our copending application Ser. No. 655,102, filed Feb. 4, 1976.

The preparation of thio-indigo and its derivatives by oxidation of corresponding 3-hydroxy-thionaphthenes is known. For example, U.S. Pat. No. 2,158,032 describes the oxidation with sodium polysulfide; this process, however, gives unsatisfactory yields and the waste water must be freed from sulfur compounds. German Patent Specification No. 194 237 describes such an oxidation with air, iron (III) chloride, potassium cyano-ferrate (III) or potassium dichromate. Though, in the case of the oxidation with air, there are no waste water problems, it is necessary to work with high dilutions and the yields are poor. An addition of copper salts raises the yields considerably, but, on the other hand, the copper must be eliminated from the dyestuff by an additional operation. Potassium dichromate and potassium cyanoferrate, too, give good yields, but they require an expensive purification of the water. In the case of iron (III) chloride, it is necessary to completely remove the formed iron oxides from the dyestuff.

In German Pat. No. 241,326 and in French Pat. No. 373,513 there are mentioned, inter alia, persulfates as oxidants for oxythionaphthene to yield thioindigo. In Example 7 of French Pat. No. 576,103 anthraquinone-2,3-oxythionaphthene is oxidized by suspending it in water under addition of sodium hydroxide and treating it at 100° C. with small portions of ammonium persulfate.

Now, we have found that thioindigo dyestuffs can be obtained with high yields and excellent purity by oxidizing 3-hydroxy-thionaphthenes and using, as the oxidizing agent, a peroxodisulfate, preferably an alkali metal- or ammonium-peroxo-disulfate, in an aqueous-alkaline solution, when the reaction temperature is −20° to +50° C.

The process of the invention is advantageously carried out as follows:

1 Mol of the corresponding 3-hydroxy-thionaphthene is dissolved in the 1- to 3-fold molar quantity of an alkali metal hydroxide solution, preferably in a 5 to 20% sodium or potassium hydroxide solution, in particular in about 1.5 mol of a 7% sodium hydroxide solution, the solution so obtained is clarified and then an aqueous solution of at least 1 mol of peroxo-disulfate is added dropwise at a temperature of −20° C. to 50° C., preferably 0° C. to 20° C. An excess of peroxo-disulfate has no detrimental effect. It is of advantage to add, during the oxidation, the amount of alkali consumed by portionwise addition or, preferably, by continuous dropwise addition, in order to maintain constant the initially introduced amount of alkali in the oxidation solution.

When the oxidation is completed, the dyestuffs that have precipitated are filtered off with suction and washed until neutrality. The dyestuffs are obtained in a finely dispersed form and, if desired, they can be transformed into the pigment form by an after-treatment.

It is surprising that the oxidation with peroxo-disulfates according to the invention at low temperatures yields products with such high yields and purity, especially inasmuch as other peroxo-compounds such as hydrogen-peroxide, sodium peroxide and perborates give distinctly poorer yields.

It is surprising that the oxidation according to the invention with peroxo-disulfates yields products with such high yields and purity, because other peroxo-compounds such as hydrogen-peroxide, sodium peroxide with perborates give distinctly poorer yields.

If it is desired to transform the products into the form of pigments, such a transformation can be carried out by mechanical dispersion and/or by a treatment with auxiliary agents such as surface-active agents and/or with organic solvents. These auxiliary agents may also be added before the oxidation, provided they are stable under the conditions of the process. The appropriate selection of the conditions of the after-treatment permits the obtention of pigments with either high transparency or covering power.

Surface-active agents which may be added before, during or after the oxidation, are, for example, resin soaps, alkylphenolpolyglycol ethers and the sulfates thereof, alkylphenolsulfonates, fatty acids, fatty alcohol polyglycol ethers, fatty amine polyglycol ethers and the sulfates thereof.

As organic solvents, especially lower alkanols, lower aliphatic ketones, lower carboxylic acid esters and aromatic, optionally halogenated hydrocarbons are suitable.

In the case of a solvent finish, the dyestuff is treated for example, with the 1- to 10-fold quantity of solvent at a temperature of up to 150° C., optionally under pressure, for a period of time of up to about 8 hours. The pigments so obtained yield dyeings with high transparency and excellent fastness to weathering. By increased finishing conditions it is also possible to obtain the pigment in a covering form.

The optionally substituted 3-hydroxy-thionaphthenes may be obtained, for example, according to the process described in U.S. Pat. No. 2,158,032. The preferred starting materials are the halogenated, in particular chlorinated derivatives as well as the 3-hydroxythionaphthenes substituted by lower alkyl groups or lower alkoxy groups, but also the corresponding benzothionaphthenes. A particularly preferred starting material is the 4,7-dichloro-3-hydroxythionaphthene which leads to the 4,4',7,7'-tetrachlorothioindigo which is excellently suitable as pigment.

The following Examples illustrate the invention, the parts being parts by weight and the percents being percents by weight.

EXAMPLE 1

41.3 Parts of 4,7-dichloro-3-hydroxythionaphthene of 96% purity were dissolved at room temperature in 163 parts of a 7% sodiumhydroxide solution. After clarification, a solution of 97.5 parts of water, 23.8 parts of sodium hydroxide solution of 33% strength and 45.8 parts of sodium peroxo-disulfate was added dropwise within 3 hours to the afore-mentioned solution. The whole was stirred for 1 hour at room temperature. The product was then filtered off with suction and washed to neutrality. The wet filter cake was adjusted with water to a total weight of 216 parts. Then, 144 parts of technical (grade) ethanol were added and the whole was heated for 5 hours to the boiling temperature. The ethanol was removed by distillation. The pigment was filtered off with suction and dried. 37.5 Parts of 4,4',7,7'-tetrachlorothioindigo having a purity of 90% were obtained, corresponding to a yield of 86% of the theory. The pigment so obtained was found to be excellently suitable for the dyeing of lacquers and plastic masses.

COMPARATIVE EXAMPLES

When repeating Example 1, but using instead of the sodium peroxo-disulfate the oxidants specified below, the indicated yield of crude products were obtained:

| oxidant | % yield |
|---|---|
| sodium perborate | 40 |
| hydrogen peroxide | 18.5 |
| sodium polysulfide | 11 |
| benzoyl peroxide | 25 |
| iron (III) chloride | 57 |
| sodium hypochlorite | 54.5 |

In the process using sodiumpolysulfide both the product and the waste water were contaminated with sulfur compounds and in the process with iron (III) chloride likewise product and waste water contained iron compounds. The process using sodium hypochlorite led to the highest yield of a product not significantly contaminated with impurities forebidding a technical process under the existing laws for environmental protection. Therefore, the purity of the product was determined (by recrystallization from chlorosulfonic acid) and was found to be 74%. Therefore, the yield of pure product was 40.5% only.

When repeating Example 1 but performing the reaction at 100° C. (as stated in Example 7 of French Pat. No. 576,103) the yield was 13.3 parts of 4,4',7,7'-tetrachlorothioindigo having a purity of 83.6%. Thus the yield was 34% of the theory.

When replacing the 4,7-dichloro-3-hydroxythionaphthene of Example 1 by the following starting materials similar results were obtained:

47.5 Parts of 4-methyl-5,7-dichloro-3-hydroxythionaphthene of 98.1% purity yielded at room temperature 36.1 parts of 4,4'-dimethyl-5,5',7,7'-tetrachlorothioindigo of 71.5% purity or 56% of the theory while at 100° C. 23.3 parts of a product of 51.5% purity were obtained, corresponding to 26% of the theory.

56.9 Parts of 5,6,7-trichloro-3-hydroxythionaphthene of 95.4% purity yielded at room temperature 46.1 g of 5,5',6,6',7,7'-hexachlorothioindigo of 53.5% purity or 46% of the theory while at 100° C. 35.7 parts of a product of 34% purity were obtained, corresponding to 22.5% of the theory.

EXAMPLE 2

41.3 Parts of 4,7-dichloro-3-hydroxythionaphthene of 96% purity were dissolved at room temperature in 163 parts of a sodium hydroxide solution of 7% strength. After clarification, a solution of 97.5 parts of water, 23.8 parts of a sodium hydroxide solution of 33% strength and 45.8 parts of sodium peroxodisulfate was added dropwise within 3 hours to the afore-mentioned solution. The whole was stirred for 1 hour at room temperature. The product was filtered off with suction and washed to neutrality. The wet press cake was adjusted with water to a total weight of 216 parts. Then, 17 parts of a sodium hydroxide solution of 33% strength and 120 parts of bleach liquor (sodium hypochlorite solution) of about 11% strength were added, while stirring. Stirring was continued at room temperature until the bleach liquor was consumed. 3.6 Parts of resin soap were added, stirring was continued for half an hour and the mixture was neutralized with diluted sulfuric acid. This suspension was combined with 144 parts of methanol and heated for 5 hours to the boiling temperature. After removal of the methanol by distillation, the product was filtered off with suction, washed until free from salt and dried.

36 g of 4,4',7,7'-tetrachlorothioindigo were obtained. The pigment so obtained showed an excellent fastness to weathering and was found to be excellently suitable for the dyeing of lacquers and plastic masses.

EXAMPLE 3

41.3 Parts of 4,7-dichloro-3-hydroxythionaphthene of 96% purity were dissolved at room temperature in 163 parts of a sodium hydroxide solution having a strength of 7%. After clarification, a solution of 64 parts of water and 40 parts of ammonium-peroxodisulfate were added dropwise within 3 hours to the afore-mentioned solution. The whole was stirred for 1 hour at 0° C. The pigment was then filtered off with suction and washed until neutrality. The wet filter press cake was adjusted with water to a total weight of 216 parts. Then, 144 parts of isobutanol were added and the suspension was heated for 5 hours to the boiling temperature. The isobutanol was removed by distillation. The pigment was filtered off and dried. 37.2 Parts of 4,4',7,7'-tetrachlorothioindigo were obtained. The pigment obtained in this manner was found to be excellently suitable for the dyeing of lacquers and plastic masses.

EXAMPLE 4

18.65 Parts of 5-chloro-7-methyl-3-hydroxythionaphthene were dissolved at room temperature in 70 parts of a 10% sodium hydroxide solution. After clarification, a solution of 50 parts of water, 11 parts of a 33% sodium hydroxide solution and 21 parts of sodium peroxodisulfate was added dropwise within 1 hour to the afore-mentioned solution. The whole was stirred for 1 hour at 0° to 5° C. Then, it was filtered with suction and washed to neutrality. The wet press cake was adjusted with water to a total weight of 99 parts. 64 Parts of isobutanol were added and the suspension was heated for 5 hours to the boiling temperature. The isobutanol was then removed by distillation. The pigment was filtered off with suction and dried. 11 Parts of 5,5'-dichloro-7,7'-dimethylthioindigo were obtained. The pigment so obtained was found to be excellently suitable for the dyeing of lacquers and plastic masses.

EXAMPLE 5

8.3 Parts of 4,5-benzo-3-hydroxythionaphthene were dissolved at room temperature in 35 parts of a 10% sodium hydroxide solution. After clarification, a solution of 25 parts of water, 5.5 parts of a sodium hydroxide solution of 33% strength and 10.5 parts of sodium peroxodisulfate was added dropwise within 1 hour at 0° to 5° C. to the afore-mentioned solution. Stirring was continued for 1 hour at 0° to 5° C., the suspension was filtered with suction, washed to neutrality and dried. 7.5 Parts of 4,4',5,5'-dibenzothioindigo were obtained. The dyestuff so obtained yielded a brown shade on cotton.

EXAMPLE 6

22.6 Parts of 6-chloro-3-hydroxythionaphthene were dissolved at room temperature in 60 parts of a 10% sodium hydroxide solution. After clarification, a solution of 50 parts of water, 12 parts of a 33% sodium hydroxide solution and 24 parts of sodium peroxodisulfate was added dropwise at 5° to 10° C. within 1 hour to the afore-mentioned solution. The suspension so obtained was stirred for 2 hours at 5° to 10° C., filtered with suction and washed to neutrality. 15.1 Parts of 6,6'-dichlorothioindigo were obtained. The dyestuff so obtained was found to yield a violet shade on cotton.

We claim:

1. In a process for preparing a thioindigo compound by oxidation of a corresponding 3-hydroxy-thionaphthene or benzothionaphthene with an aqueous alkaline solution of an ammonium or alkali metal peroxo-disulfate, the improvement comprising performing the oxidation at a temperature of −20° to +50° C.

2. A process as claimed in claim 1, wherein the 3-hydroxy-thionaphthene or benzothionaphthene is unsubstituted or substituted by halogen, lower alkyl or lower alkoxy.

3. A process as claimed in claim 1, wherein the starting material is 3-hydroxy-thionaphthene, which is unsubstituted or substituted by 1 or 2 substituents selected from chlorine, bromine and methyl or which contains an unsubstituted fused benzene ring in 4,5-position.

4. A process as claimed in claim 1, wherein the peroxodisulfate is ammonium, sodium or potassium peroxodisulfate.

5. A process as claimed in claim 1, wherein the starting material is dissolved in a one- to three-fold molar amount of an alkali metal hydroxide solution, an about molar amount of the aqueous solution of the peroxodisulfate is added to −20° to +50° C. and the alkali consumed in the reaction is added continuously or portionwise.

6. A process as claimed in claim 5, wherein 1 mol of the starting material is dissolved in about 1.5 mol of a solution of 5 to 20% by weight of an alkali metal hydroxide in water, which solution is combined, continuously, at a temperature of 0° to 20° C., with a solution of about 1 mol of peroxo-disulfate in water and a solution of about 1 mol of an alkali metal hydroxide in water.

* * * * *